United States Patent
Chen et al.

(10) Patent No.: US 8,583,075 B2
(45) Date of Patent: Nov. 12, 2013

(54) POWER SUPPLY CONTROL APPARATUS AND METHOD THEREOF AND MOBILE APPARATUS USING THE SAME

(75) Inventors: Chien-Sheng Chen, Hsinchu Hsien (TW); Chien-Shan Chiang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 138 days.

(21) Appl. No.: 13/097,920

(22) Filed: Apr. 29, 2011

(65) Prior Publication Data
US 2012/0028575 A1    Feb. 2, 2012

(30) Foreign Application Priority Data
Jul. 28, 2010    (TW) ............................... 99124926 A

(51) Int. Cl.
*H04B 1/16*    (2006.01)
(52) U.S. Cl.
USPC ............... 455/343.2; 455/343.1; 455/41.1; 455/572; 455/574; 340/10.1; 340/10.34
(58) Field of Classification Search
USPC ............ 455/418–420, 41.1, 41.2, 572–574, 455/343.1–343.6; 340/10.1, 10.3, 10.33, 340/10.34
See application file for complete search history.

(56) References Cited

U.S. PATENT DOCUMENTS

| | | | | |
|---|---|---|---|---|
| 6,427,065 | B1 * | 7/2002 | Suga et al. | 455/41.1 |
| 6,807,400 | B2 * | 10/2004 | Flaxl | 455/41.1 |
| 8,063,746 | B2 * | 11/2011 | Borcherding | 340/10.34 |
| 2006/0202804 | A1 * | 9/2006 | Vijay-Pillai et al. | 340/10.33 |
| 2007/0015465 | A1 * | 1/2007 | Giroud et al. | 455/41.2 |
| 2009/0231179 | A1 * | 9/2009 | Bruhn | 341/176 |
| 2009/0291635 | A1 * | 11/2009 | Savry | 455/41.1 |

* cited by examiner

*Primary Examiner* — Tuan A Tran
(74) *Attorney, Agent, or Firm* — WAPT, PC; Justin King

(57) ABSTRACT

A power supply control apparatus is applied to a communication apparatus that is applied to a mobile apparatus. The power supply control apparatus includes a switch, coupled between the communication apparatus and a power supply; and a signal detecting unit, for detecting a wireless signal via an electromagnetic introduction approach to correspondingly generate a detection signal. It is determined whether to provide power to the communication apparatus via the switch according to the detection signal.

14 Claims, 7 Drawing Sheets

POWER SUPPLY CONTROL APPARATUS AND METHOD THEREOF AND MOBILE APPARATUS USING THE SAME

CROSS REFERENCE TO RELATED PATENT APPLICATION

This patent application is based on Taiwan, R.O.C. patent application No. 099124926 filed on Jul. 28, 2010.

FIELD OF THE INVENTION

The present invention relates to a power supply control apparatus and method thereof, and more particularly, to a power supply control apparatus and method thereof applied to a communication apparatus.

BACKGROUND OF THE INVENTION

After decades of development, contactless chip cards are widely used everywhere in daily lives, such as transportation, security control and electronic payment. Moreover, because of the widespread use of contactless chip cards in the fields of rapid transit, logistic management, product authentication and identification, the contactless chip card technology continuously develops and becomes more diversified. Likewise, mobile devices which are multifunctional become indispensible in daily lives. Specifically, there is a trend to allow mobile communication devices to integrate with radio frequency identification (RFID) technology, which can provide electronic payment functionality.

A near-field communication (NFC) technology is a short distance wireless technology which follows the ISO/IEC 18092 and ISO/IEC 21481 standard. The operating frequency of NFC is 13.56 MHz and bracket of the communication distance is measured in centimeters. A NFC device can perform bi-directional communication, as well as performing contactless transactions, contactless access of various types of digital content, and wireless connection to other NFC devices. The NFC technique, as an integration of contactless identification and interconnection, is a type of RFID technique. NFC technology is evolved from a contactless smart card (CSC) technique and follows the ISO/IEC 14443 type A standard. Therefore, the electronic apparatus supporting the NFC function becomes an electronic payment tool for business transactions.

Applications of the NFC technique can be grouped to three main types:

1. Touch and go: A touch and go application is typically used in personal identification and electronic ticket authentication, such as door security systems, information registration systems, document signing systems, check-in systems, electronic transport tickets, entrance tickets, and the like. Only an NFC device stored with an identification data or an electronic ticket data is needed to be sensed by a reader (e.g., a card reader). Accordingly, several chip cards can be integrated into one NFC device. In addition, the touch and go NFC device may be used for data retrieving, such as reading a website address from a tag of a smart poster.

2. Touch and confirm: Touch and confirm applications are typically used in mobile business payment mechanism environments. For example, a consumer completes a payment using the NFC device. The NFC device may be stored with credit card information, a value card data, or an electronic wallet data for electronic transactions.

3. Touch and connect: Touch and connect applications typically involve two NFC devices which are connected to perform peer-to-peer data transmission, such as digital content (e.g., music) download/transfer, image exchange, or synchronization of an address book with a remote device.

FIG. 1 is a function block diagram of a conventional mobile phone supporting a NFC communication payment function. The mobile phone 10 supporting the NFC communication payment function comprises an antenna 110, an NFC chip 130, a security chip 150, a control chip 170, and a subscriber identity module (SIM) card 190. The security chip 150 is stored with identification data, while the control chip 170 and the SIM card 190 function to perform specific functions during a phone call.

When a user wishes to perform an electronic payment identification procedure, he controls the mobile phone 10 to approach an NFC reader (not shown). The mobile phone 10 receives data transmitted from the reader via the antenna 110. The NFC chip 130 performs the electronic payment identification procedure according to the data transmitted from the reader and the identification data of the security chip 150. During the electronic payment identification procedure, the NFC chip 130 communicates with the reader via the antenna 110, and transmits the identification data of the security chip 150 into the reader for the electronic payment function.

The NFC chip 130 is only powered by a battery (not shown) of the mobile phone 10, and cannot operate when the battery is removed or has insufficient power. For example, when the mobile phone 10 is set to function as a transportation ticket, a problem occurs during the electronic payment identification procedure when the battery of the mobile phone 10 cannot supply power.

FIG. 2 is a block diagram of a conventional mobile phone supporting an NFC payment function. A mobile phone 20 supporting the NFC payment function comprises an antenna 210, an NFC chip 230, a control chip 270, and a SIM card 290. Functions of the antenna 210, the NFC chip 230, and the control chip 270 are respectively similar to those of the antenna 110, the NFC chip 130, and the control chip 170, described above. The difference between mobile phone 10 and mobile phone 20 is that the SIM card 290 further includes functions of the security chip 150, in addition to the SIM card 190 functions, which means, SIM card 290 functions as a smart card which integrates functions of the security chip 150.

Likewise, when the user wishes to perform an electronic payment identification procedure, the NFC chip 230 communicates with an NFC reader (not shown) according to an identification data of the SIM card 290 to perform the identification procedure.

The NFC chip 230 is connected to the SIM card 290 via an interface implementing a single wire protocol (SWP). Therefore, besides the external battery, the NFC chip 230 can receive electrical power from a wireless signal during interfacing. Even if the battery of the mobile phone 20 is drained, the NFC chip 230 can still operate to communicate with the SIM card 290 via the SWP interface to perform the electronic payment from the power supply generated from the wireless signal. However, since power from the wireless signal from the NFC reader may be weak, power obtained by the NFC chip 230 from the wireless signal is rather limited; a rather short communication distance is required between the NFC chip 230 and the NFC reader when electronic power for operating the NFC chip 230 is only provided from the wireless signal. In order to avoid the foregoing problem, power for operating the NFC chip 230 is mainly provided from the battery inside the mobile phone 20.

In order to make sure that the electronic payment identification procedure can be performed via the mobile phone 20 at any given time, power is continuously provided from the battery of the mobile phone 20 to the NFC chip 230 to maintain operation, which continuously consumes power. However, battery power of the mobile phone 20 is extremely limited, and standby time of the mobile phone 20 is seriously limited because of power consumption of the NFC 230, which is a significant disadvantage for a power-saving mobile apparatus.

Therefore, a power supply control apparatus and method thereof applied to a mobile apparatus is needed to reduce power consumption of the mobile apparatus thereby increasing a standby time of the mobile apparatus.

SUMMARY OF THE INVENTION

One object of the present invention is to provide an electronic power supply control apparatus and method thereof applied to a communication apparatus. Accordingly, through controlling a switch to determine whether to provide power from a battery of a mobile apparatus to the communication apparatus, the mobile apparatus maintains a power-saving mode when electronic payment is not performed to achieve an object of reducing power consumption.

According to an embodiment of the present invention, a power supply control apparatus applied to a communication apparatus comprises a switch, coupled between a communication circuit and a power supply; and a signal detecting unit, for detecting a wireless signal via electromagnetic induction to correspondingly generate a detection signal that is for controlling the switch to determine whether to provide power to the communication apparatus.

According to another embodiment of the present invention, a power supply control method applied to a communication apparatus comprises detecting a wireless signal via electromagnetic induction to correspondingly generate a detection signal; and determining whether to provide power to a communication circuit of the communication apparatus according to the detection signal.

According to yet another embodiment of the present invention, a mobile apparatus comprises a communication apparatus; a switch, coupled between the communication apparatus and a power supply; and a signal detecting unit, for detecting a wireless signal via electromagnetic induction to correspondingly generate a detection signal that is for controlling the switch to determine whether to provide power to the communication apparatus.

According to a power supply control apparatus and method thereof applied to a communication apparatus provided by the present invention, power is only provided to the communication apparatus when a communication function is performed to reduce power consumption of a battery of a mobile apparatus thereby achieving an object of increasing a standby time of the mobile apparatus.

The advantages and spirit related to the present invention can be further understood via the following detailed description and drawings.

DETAILED DESCRIPTION OF THE PREFERRED EMBODIMENT

In order to solve the power-consumption problem of the NFC apparatus of the conventional mobile apparatus, the power control apparatus according to one embodiment of the present invention includes a switch configured between a battery of a mobile device and an NFC device. When no wireless signal of an NFC reader is detected, the power supply control apparatus turns off the switch to stop providing power from the battery of the mobile apparatus to the NFC device. Upon detecting the wireless signal transmitted from the NFC reader, the power supply control apparatus turns on the switch to provide power from the battery of the mobile apparatus to the NFC device.

Figure 1:
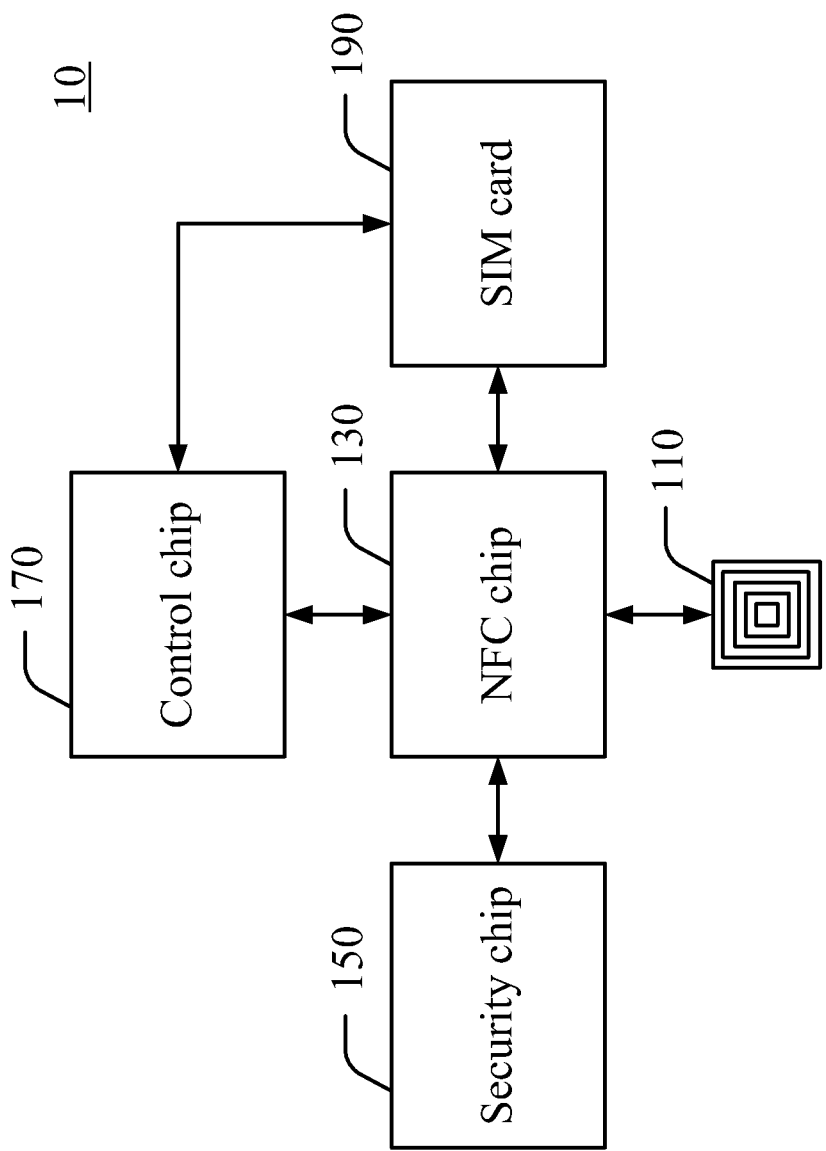
FIG. 1 is a block diagram of functions of a mobile phone supporting an NFC payment function.
Figure 2:
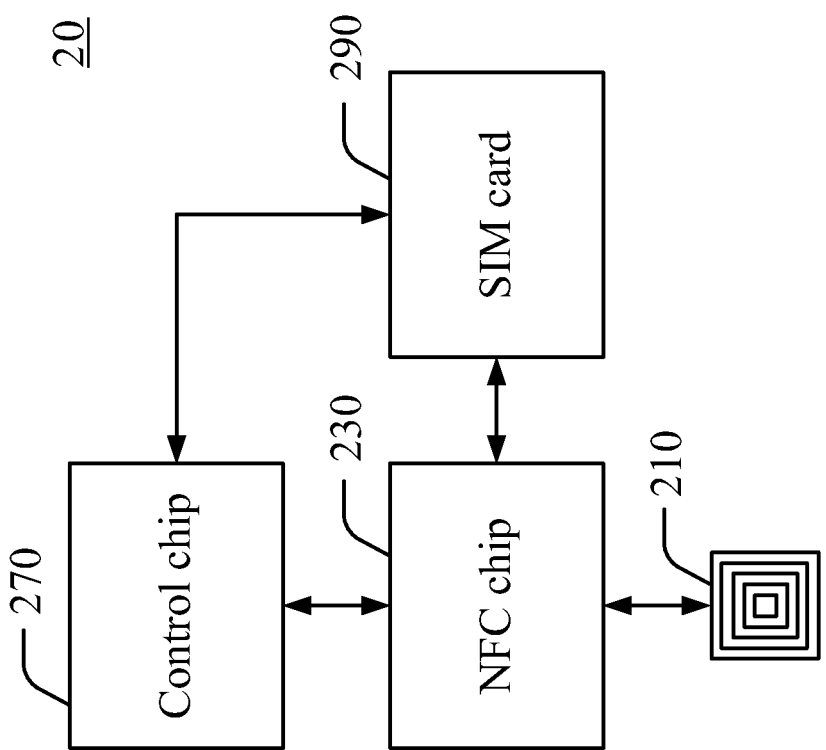
FIG. 2 is a block diagram of functions of a mobile phone supporting an NFC payment function.
Figure 3:
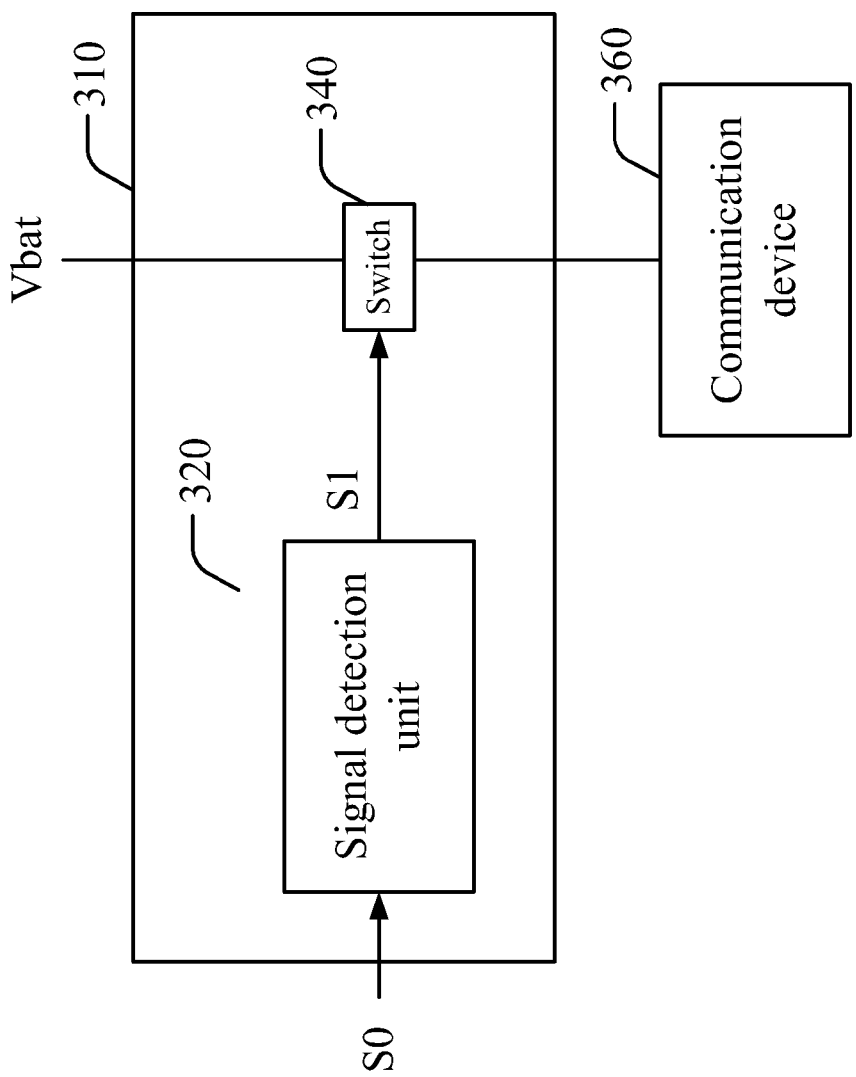
FIG. 3 is a block diagram of functions of a power supply control apparatus applied to a communication apparatus in accordance with a first embodiment of the present invention.
Figure 4:
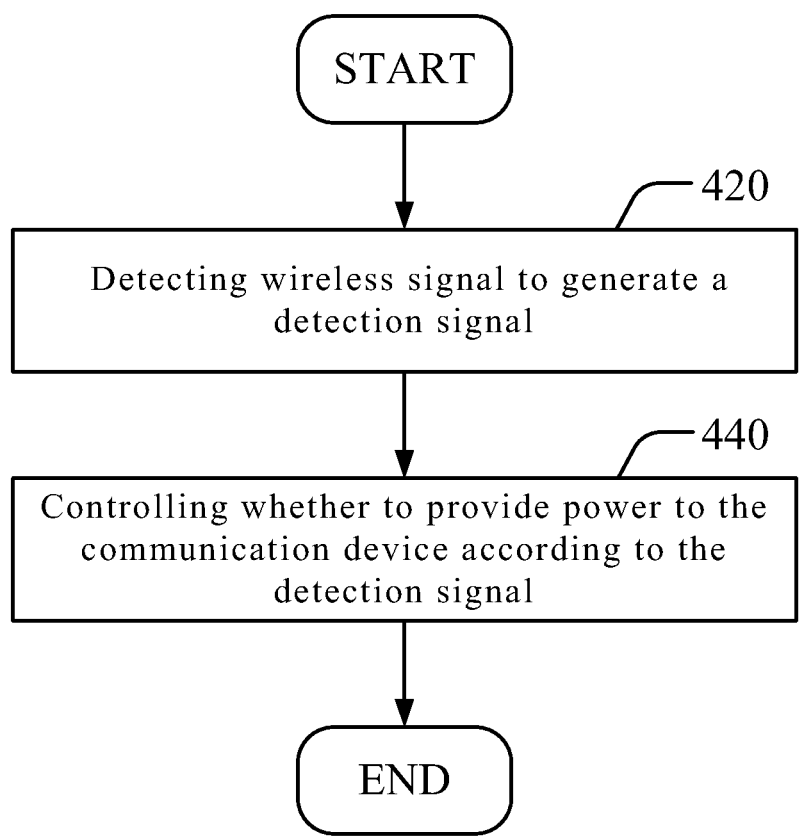
FIG. 4 is a flow chart of a power supply control method for the power supply control apparatus in accordance with an embodiment of the present invention.

FIG. 3 is a block diagram of functions of a power supply control apparatus applied to a communication device in accordance with a first embodiment of the present invention. A power supply control apparatus 310 comprises a signal detecting unit 320 and a switch 340. FIG. 4 is a flow chart of a power supply control method for the power supply apparatus in the first embodiment of the present invention. For example, a communication device is the foregoing NFC device.

In Step 420, a signal detecting unit 320 detects a wireless signal S0 transmitted from an NFC reader (not shown) via electromagnetic induction to generate a detection signal S1. For example, when the signal detecting unit 320 detects the wireless signal S0 transmitted from the NFC reader, it generates the detection signal S1 having a value of 1; otherwise, when the signal detecting unit 320 detects that the strength of wireless signal S0 transmitted from the NFC reader is weakened to a predetermined extent or no wireless signal S0 is detected, it generates the detection signal S1 having a value of 0.

In Step 440, it is determined whether to provide power Vbat of a battery (not shown) of the mobile apparatus to the communication device 360 according to a status of the switch 340 controlled via the detection signal S1. For example, when the value of the detection signal S1 generated by the signal detecting unit 320 is 1, the switch 340 is turned on to provide power from the battery to the communication device 360. When the value of the detection signal S1 detected by the signal detecting unit 320 is 0, the switch 340 is turned off to stop providing power from the battery to the communication apparatus 360.

Figure 5:
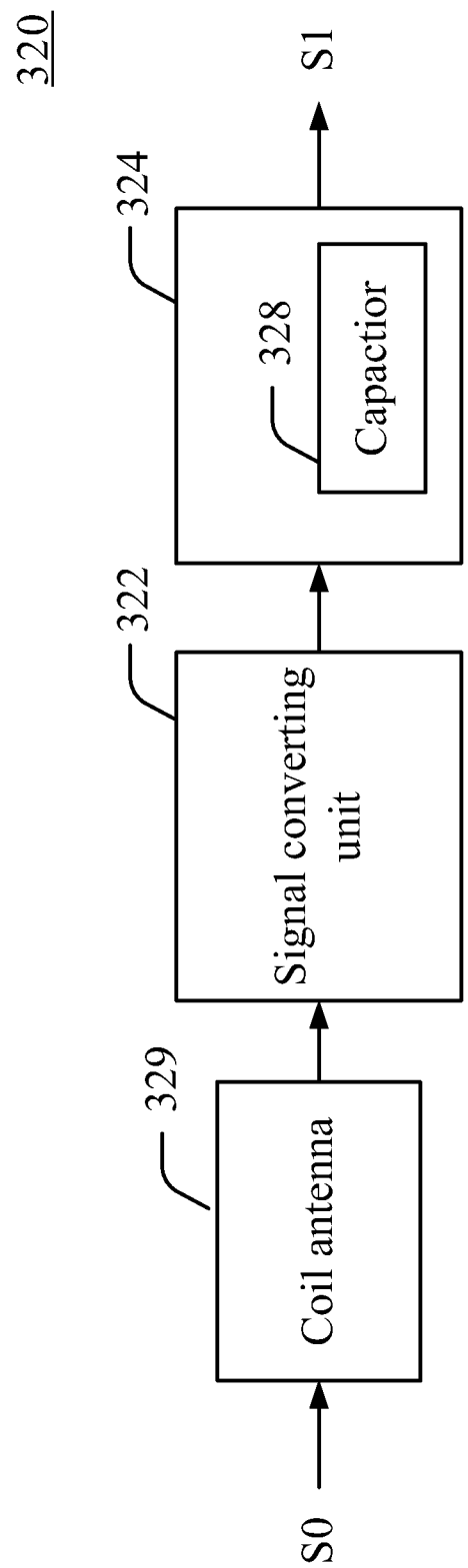
FIG. 5 is a block diagram of functions of a signal detecting unit in accordance with an embodiment of the present invention.

FIG. 5 is a block diagram of functions of a signal detecting unit in accordance with an embodiment of the present invention. The signal detecting unit 320 comprises a signal converting unit 322, a filter unit 324, and a coil antenna 329.

The coil antenna 329 detects whether the wireless signal S0 is received via electromagnetic induction. When the wireless signal S0 is detected, the coil antenna 329 generates an alternating current (AC) signal according to the wireless signal S0 via the induction approach. The signal converting unit 322 converts the AC signal to a direct current (DC) signal. For example, the signal converting unit 322 is a rectifier, e.g., a full-bridge circuit or a half-bridge circuit. The filter unit 324 comprising a capacitor 328 which removes ripple of the DC signal outputted by the signal converting unit 322 via power of the DC signal temporarily stored in the capacitor 328 to generate the detection signal S1.

In this embodiment, upon detecting the wireless signal S0 transmitted from the NFC reader (not shown), the coil antenna 329 begins to convert the wireless signal S0 to the AC signal. The signal converting unit 322 converts the AC signal to the DC signal for charging the capacitor 328. When the capacitor 328 completes charging, the filter unit 324 outputs the detection signal S1 having the value of 1, which means that the signal detecting unit 320 has detected the wireless signal S0 transmitted from the NFC reader. At this point, the switch 340 is turned on according to the detection signal S1 to provide power from the battery to the communication device 360. Therefore, the communication device 360 has enough power for communicating with the NFC reader.

When the strength of wireless signal S0 detected by the signal detecting unit 320 is below a predetermined level or the wireless signal S0 is not detected, the signal detecting unit 320 generates the detection signal S1 having the value of 0, which means that the detecting unit 320 lost connection from the NFC reader. At this point, the switch 340 turns off accordingly to stop providing power from the battery to the communication device 360 thereby achieving an object of reducing power consumption.

Figure 6:
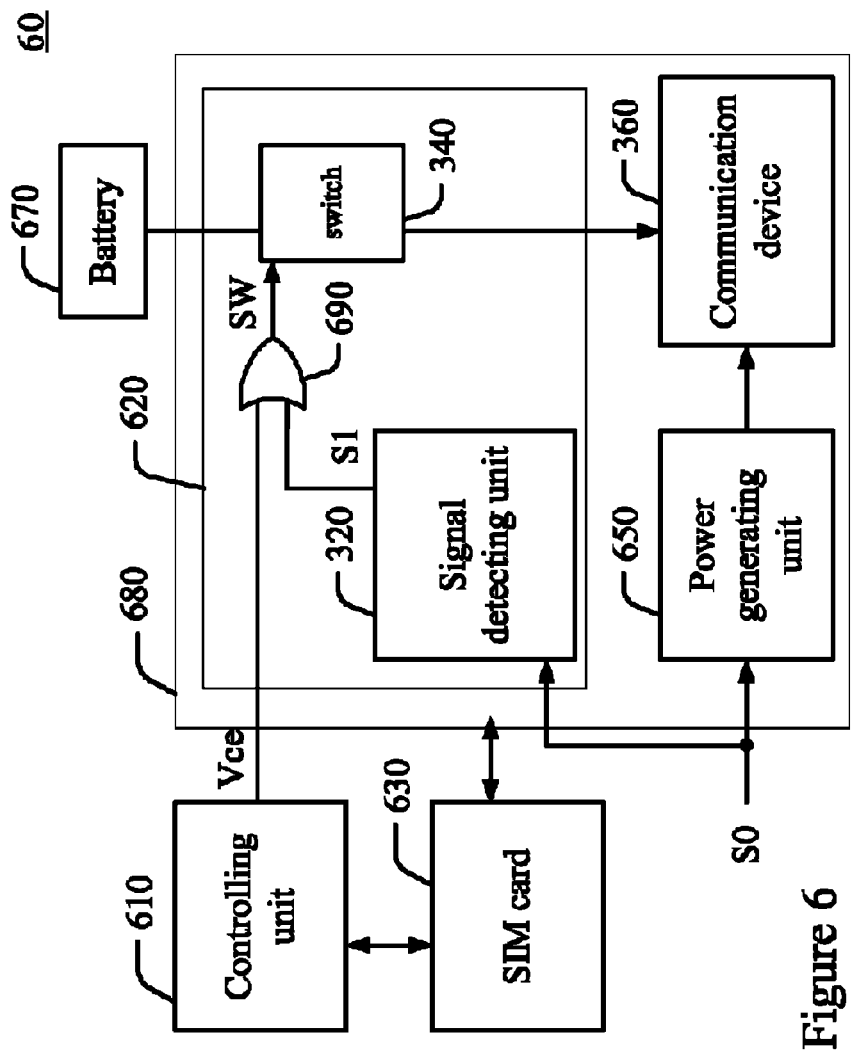
FIG. 6 is a block diagram of functions of a mobile apparatus using a power supply control apparatus in accordance with an embodiment of the present invention.

FIG. 6 is a block diagram of functions of a mobile apparatus of a power supply control apparatus in accordance with a second embodiment of the present invention. A mobile device 60 comprises a controlling unit control device 610, an SIM card 630, a battery 670, and an NFC chip 680, which comprises a communication device 360, a power supply control apparatus 620 and a power generating unit 650. The power supply control apparatus 620 comprises a signal detecting unit 320, a switch 340, and an OR gate 690 for receiving signals from the controlling unit 610 (Vce) and signal detecting unit 320 (S1) and generating an output switch signal SW, sent to switch 340, based on these signal inputs. It is to be noted that, although in this embodiment the communication device 360 and the power supply control apparatus 620 are integrated in the NFC chip 680, in practice, the communication apparatus 360 and the power supply control apparatus 620 can also be configured in different chips.

Operations of the signal detecting unit 320, the switch 340, and the communication device 360 are similar to those described in the other embodiments, however, one difference between the present embodiment and the foregoing embodiments is that a control signal Vce for controlling the switch 340 is implemented to determine whether or not to provide power from the battery 670 to the communication apparatus 360. For example, the user controls the control device 610 via a user interface (UI) (not shown) of the mobile apparatus 60 to set a value of the control signal Vce as 0, so that the mobile apparatus 60 enters a power-saving mode in which power is no longer being provided from the battery 670 to the communication device 360 when the communication apparatus 360 does not operate thereby achieving the object of the reducing power consumption of mobile apparatus 60. More specifically, the OR gate 690 generates a switch signal SW according to the control signal Vce and the detection signal S1 to control a status of the switch 340 thereby achieving an object of controlling whether to provide power from the battery 670 to the communication apparatus 360.

In this embodiment, the user operates the UI to control the control device 610 to determine whether to set the mobile apparatus 60 as being in the power-saving mode. When the user sets the mobile apparatus 60 in the power-saving mode, the control apparatus 610 defines the value of the control signal Vice as 0 to stop providing power from the battery 670 to the communication device 360 when the wireless signal S0 is not detected, so that the communication device stops operating to save power consumption. When the signal detecting unit 320 does not detect the wireless signal S0, the signal detecting unit 320 generates the detection signal S1 having the value of 0. At this point, two inputs value of the OR gate 690 are both 0, such that the OR gate 690 outputs the switch signal SW having the value of 0 to turn off the switch 340. Accordingly the communication device 360 cannot obtain power of the battery 670, reducing power consumption.

When the user wishes to perform electronic payment via the mobile apparatus 60, he controls the mobile apparatus 60 to approach a NFC reader (not shown). At this point, the signal detecting unit 320 detects the wireless signal S0 transmitted from the NFC reader via electromagnetic induction to generate the detection signal of value of 1, so that the switch signal SW outputted by the OR gate 690 also has the value of 1 to turn on the switch 340, and thus power is provided from the battery 670 to the communication device 360. Therefore, the communication device has enough power for communicating with the SIM card 630 and the NFC reader to perform the electronic payment. That is, even if the mobile apparatus 60 is in the power-saving mode, once the signal detecting unit 320 detects the wireless signal S0, the detection signal S1 having the value of 1 is generated via the signal detecting unit 320 to turn on the switch 340, so that the battery 670 provides power to operate the communication device 360 for the electronic payment.

In addition, when the mobile device 60 is in a turn-off status, and the signal detecting unit 320 detects the wireless signal S0 transmitted from the NFC reader, the signal detecting unit 320 generates the detection signal S1 having the value of 1 to turn on the switch 340, so that the communication device 360 can communicate with the NFC reader using power of the battery 670. Therefore, according to the present invention, while standby time of the mobile apparatus 60 can be longer, the communication apparatus 360 still can directly get power from battery 670 (if it still has power) to perform a long-distance and stable communication when the mobile apparatus 60 is in the turn-off status. When the battery 670 runs out of power, the mobile apparatus 60 receives power of the wireless signal S0 via the power generating unit 650 to provide power to the communication apparatus 360 for communication.

Figure 7:
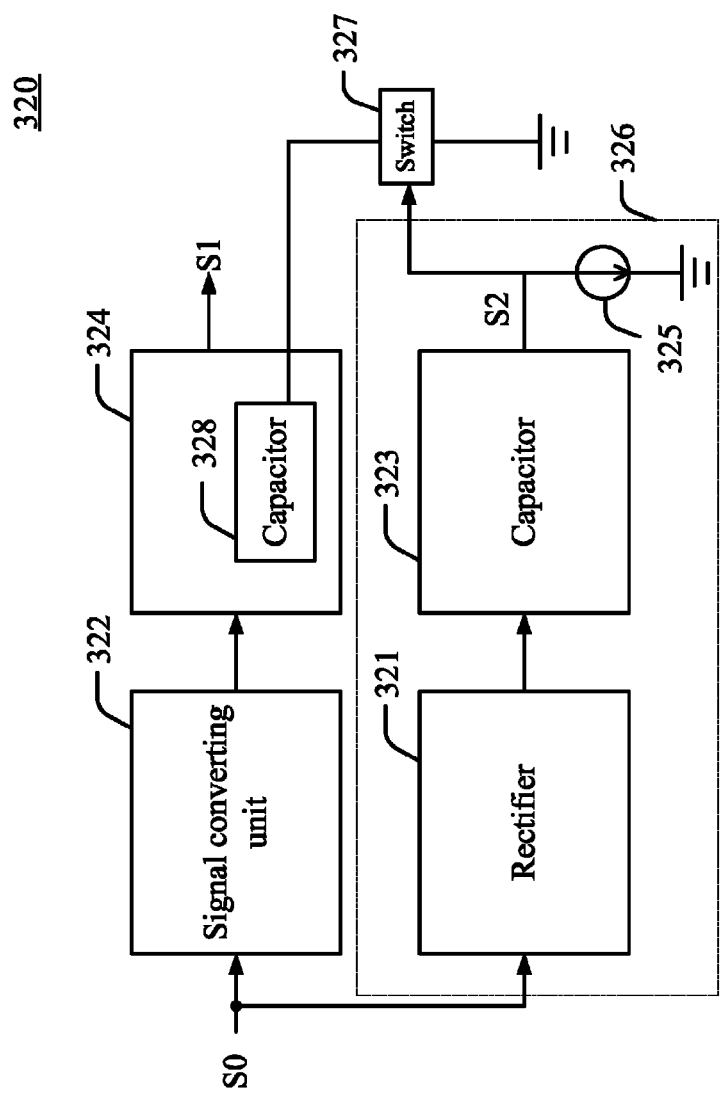
FIG. 7 is a block diagram of functions of a signal detecting unit in accordance with an embodiment of the present invention.

FIG. 7 is a function block diagram of a signal detecting unit 320 in accordance with an embodiment of the present invention. The signal detecting unit 320 comprises a signal converting unit 322, a filter unit 324, a discharge indication circuit 326, a switch 327, and a coil antenna 329. The filter unit 324 comprises a capacitor 328. The discharge indicating circuit 326 comprises a rectifier 321, a capacitor 323, and a discharge unit 325. The switch 327 coupled between the capacitor 328 and ground is controlled by an indicating signal S2. Operations of the signal converting unit 322, the filter unit 324, and the coil antenna 329 are similar to those of the foregoing embodiments, and shall not be described for brevity.

In this embodiment, the coil antenna 329 detects the wireless signal S0, and generates an AC signal according to the wireless signal S0 via electromagnetic induction. The signal converting unit 322 converts the AC signal to a DC signal. The capacitor 328 charges the DC signal to a predetermined voltage level and maintains at the predetermined voltage level. The discharge indicating circuit 326 detects whether the wireless signal S0 is disappearing or weakening thereby determining whether the mobile apparatus is getting away from the NFC reader. When the discharge indication circuit 326 detects that the wireless signal S0 is weakened to a predetermined level or is not present, an indicating signal S2 is generated to turn on the switch 327 so as to discharge the capacitor.

More specifically, the rectifier 321 detects whether the wireless signal S0 is received via the coil antenna 329. When the coil antenna 329 detects the wireless signal S0, the AC signal is converted to the DC signal. The rectifier 321 may be a full-bridge circuit or a half-bridge circuit, as an example, but is not limited to these specific components.

In this embodiment, when the antenna 329 detects the wireless signal S0 transmitted from the NFC reader, the rectifier 321 converts the AC signal generated by the coil antenna 329 to the DC signal, and starts charging the capacitor 323. On the contrary, the discharge unit 325 discharges power stored in the capacitor 323.

When the signal detecting unit 320 approaches the NFC reader, it means that the rectifier 321 continuously receives AC signals, i.e., the rectifier 321 continuously charges the capacitor 323. Since a charging speed of the capacitor 323 is faster than a discharging speed of the discharge unit 325, power stored in the capacitor 323 cannot be completely discharged by the discharge unit 325, such that the capacitor 323 maintains at a predetermined voltage level. At this point, the indicating signal S2 indicates to turn off the switch 327, and the capacitor 328 is not discharged, so that the filter unit 324 generates the detection signal S1 having the value of 1, meaning that the signal detecting unit 320 actually receives the wireless signal S0.

When the signal detecting unit 320 goes away from the NFC reader, meaning that the rectifier 321 cannot receive AC signals or the AC signals are weakened to an extent, and a speed of charging the capacitor 323 by the rectifier 321 is slower than that of discharging the capacitor 323 by the discharge unit 325, electric power temporarily stored in the capacitor 323 is completely discharged by the discharge unit 325. When the discharge 325 discharges power of the capacitor 323 to a predetermined extent or the capacitor 323 completes being discharged, the indicating signal S2 indicates to turn on the switch 327 so as to discharge power temporarily stored in the capacitor 328, so that the filter unit 324 can generate the detection signal S1 having the value of 0, which means that the signal detecting unit 320 leaves from the NFC reader.

In conclusion, according to the present invention, a power supply control apparatus and method thereof applied to a communication apparatus are provided. Through controlling a switch to determine whether to provide power from a battery of a mobile apparatus to a communication apparatus, the communication apparatus of the mobile apparatus only starts operating when communication is performed. That is, according to the present invention, the mobile apparatus, having an NFC function, is set as in a power-saving mode when electronic payment is not performed. Hence, the mobile device can have a less power consumption and longer standby time.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A power supply control apparatus, adapted to a communication device, comprising:
    a power switch, coupled to a power supply, for controlling the flow of power from the power supply to the communication device; and
    a signal detecting unit, for detecting a wireless signal via electromagnetic induction to generate a detection signal for controlling the switch to determine whether to provide power to the communication device from the power supply, comprising:
        a coil antenna, for detecting whether the wireless signal is received via electromagnetic induction and converting the wireless signal to an alternating current (AC) signal via electromagnetic induction;
        a signal converting unit, for converting the AC signal to a direct current (DC) signal;
        a filter unit, comprising a filter capacitor, for removing ripple of the DC signal and generating the detection signal when the filter capacitor is charged;
        a ground switch, connected to ground;
        a discharge indicating circuit, comprising:
            a rectifier, for detecting whether the wireless signal is received via the coil antenna;
            a discharge capacitor, for storing power received from the rectifier; and
            a discharge unit, for discharging power stored in the discharge capacitor to a predetermined extent;
    wherein the filter capacitor and the discharge capacitor are coupled to the ground switch;
    wherein an indicating signal activates the ground switch to connect to ground when power stored in the discharge capacitor is completely discharged by the discharge unit, causing the filter capacitor to discharge;
    wherein the power switch is controlled by a logical OR gate receiving input signals from a controlling unit controlled by a user operating a user interface, and the signal detecting unit.

2. The power supply control apparatus as claimed in claim 1, wherein when the signal detecting unit detects the wireless signal, the detection signal is for switching the switch to a turn-on status so as to provide power from the power supply.

3. The power supply control apparatus as claimed in claim 1, wherein the communication device is a near-field communication (NFC) device, and the wireless signal is generated from an NFC reader.

4. The power supply control apparatus as claimed in claim 1, being implemented as a component of a mobile apparatus.

5. The power supply control apparatus as claimed in claim 1, wherein the power supply comprises a battery and a power generating unit, and when power of the battery is drained, the power generating unit converts the wireless signal into power for the communication device.

6. A power supply control method, adapted to a communication device, comprising:
    detecting a wireless signal via electromagnetic induction to generate a detection signal, comprising the steps of:
        converting the wireless signal to an AC signal via electromagnetic induction;
        converting the AC signal to a DC sign removing ripple of the DC signal;
        generating the detection signal when a filter capacitor is charged;

detecting whether the wireless signal is received via a coil antenna;

storing power received from a rectifier in a discharge capacitor;

discharging power stored in the discharge capacitor to a predetermined extent;

generating an indicating signal to activate a ground switch to connect the filter capacitor and the discharge capacitor to ground when power stored in the discharge capacitor is completely discharged; and determining whether to provide power to the communication device according to the detection signal;

controlling the flow of power from the power supply to the communication device based on a logical OR operation using input signals from a user operating a user interface, and the detection signal.

7. The power supply control method as claimed in claim 6, wherein when the wireless signal is detected, power is provided to the communication apparatus.

8. The power supply control method as claimed in claim 6, further comprising:

providing power from a battery to the communication device when power of the battery is present; and converting the wireless signal into power for providing to the communication device when power of the battery is drained.

9. The power supply control method as claimed in claim 6, wherein the communication apparatus is an NFC apparatus.

10. The power supply control method as claimed in claim 9, wherein the wireless signal is generated from an NFC reader.

11. A mobile apparatus, comprising:

a communication device;

a switch, coupled between the communication device and a power supply, for controlling the flow of power from the power supply to the communication device; and a signal detecting unit, for detecting a wireless signal via electromagnetic induction to generate a detection signal for controlling the switch to determine whether to provide power to the communication device, comprising:

a coil antenna, for detecting whether the wireless signal is received via electromagnetic induction and converting the wireless signal to an alternating current (AC) signal via electromagnetic induction;

a signal converting unit, for converting the AC signal to a direct current (DC) signal;

a filter unit, comprising a filter capacitor, for removing ripple of the DC signal and generating the detection signal when the filter capacitor is charged;

a ground switch, connected to ground;

a discharge indicating circuit, comprising:

a rectifier, for detecting whether the wireless signal is received via the coil antenna;

a discharge capacitor, for storing power received from the rectifier; and a discharge unit, for discharging power stored in the discharge capacitor to a predetermined extent;

wherein the filter capacitor and the discharge capacitor are coupled to the ground switch;

wherein an indicating signal activates the ground switch to connect to ground when power stored in the discharge capacitor is completely discharged by the discharge unit, causing the filter capacitor to discharge;

wherein the power switch is controlled by a logical OR gate receiving input signals from a controlling unit controlled by a user operating a user interface, and the signal detecting unit.

12. The mobile apparatus as claimed in claim 11, wherein when the signal detecting unit detects the wireless signal, switching the switch to a turn-on status to provide power to the communication device.

13. The mobile apparatus as claimed in claim 11, wherein the wireless signal is generated from an NFC reader.

14. The mobile apparatus as claimed in claim 11, wherein the wireless signal is a wireless radio frequency identification (RFID) signal.

* * * * *